H. A. LACERDA.
STAY BOLT FOR BOILERS.
APPLICATION FILED JAN. 2, 1915.

1,130,525.

Patented Mar. 2, 1915.

WITNESSES:
H. T. Walker

INVENTOR
Harry A. Lacerda
BY
ATTORNEY

UNITED STATES PATENT OFFICE.

HARRY ANTHONY LACERDA, OF SCHENECTADY, NEW YORK.

STAY-BOLT FOR BOILERS.

1,130,525.　　　　　　　Specification of Letters Patent.　　Patented Mar. 2, 1915.

Application filed January 2, 1915. Serial No. 115.

*To all whom it may concern:*

Be it known that I, HARRY A. LACERDA, a citizen of the United States, and a resident of Schenectady, in the county of Schenectady and State of New York, have invented a new and Improved Stay-Bolt for Boilers, of which the following is a full, clear, and exact description.

The object of the invention is to provide a new and improved stay bolt for the fire boxes of boilers and like structures and arranged to prevent leakage, to allow expansion and contraction of the bolt without unduly straining the boiler sheets, and to permit movement of the sheets in the direction of their plane without causing shearing or similar injuries to the stay bolt.

In order to accomplish the desired result, use is made of a tubular plug engaging one of the boiler sheets and a compensating tubular sleeve nut arranged within the said plug and screwing on the stay bolt, the end of the sleeve portion being rigidly connected with the end of the plug.

A practical embodiment of the invention is represented in the accompanying drawings forming a part of this specification, in which similar characters of reference indicate corresponding parts in all the views.

Figure 1:
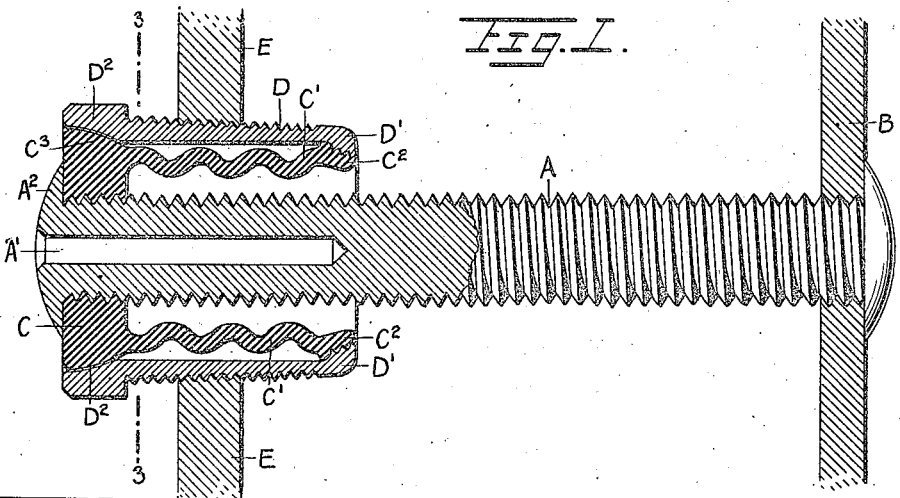
Figure 2:
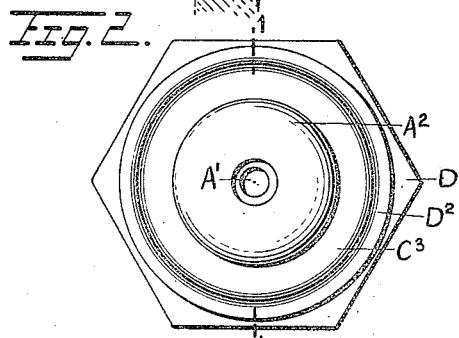
Figure 3:
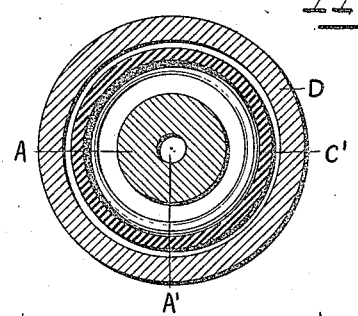
Figure 4:
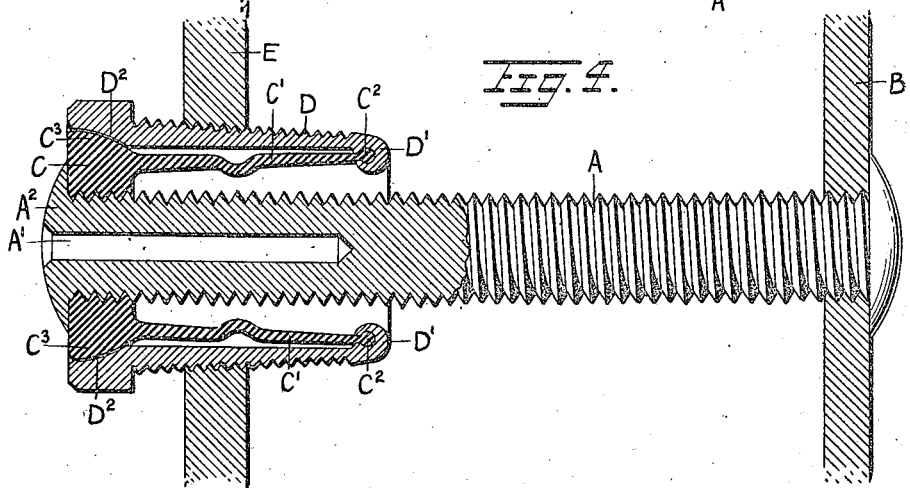

Figure 1 is a sectional side elevation of the stay bolt on the line 1—1 of Fig. 2 and as applied; Fig. 2 is a front end view of the stay bolt; Fig. 3 is a cross section of the same on the line 3—3 of Fig. 1; and Fig. 4 is a sectional side elevation of the modified form as applied.

The stay bolt A engages at its inner end the sheet B and on its outer end screws a nut C provided with an inwardly extending sleeve C' having its rear end $C^2$ rigidly connected with the inner end D' of a tubular plug D screwing in the sheet E. The nut C and the sleeve C' form a sleeve nut, of which the sleeve C' is preferably provided with one or more corrugations extending transversely to the axis of the stay bolt so that the sleeve C' can readily expand or contract in a longitudinal direction without affecting the position of the nut C on the end of the bolt A. The nut C forms with the outer end of the plug D a ball and socket joint, of which the ball member $C^3$ is preferably on the nut and the socket member $D^2$ is on the plug, as plainly indicated in the drawings. The inner end $C^2$ of the sleeve C' may be screwed to the inner end D' of the plug D, as shown in Fig. 1, or the said ends $C^2$ and D' may be welded together, as illustrated in Fig. 4, or other means may be employed for fastening the said inner sleeve and plug ends together.

It will be noticed that by the ball and socket joint connection between the sleeve nut and the plug D, a shifting of the sheets B and E in the direction of their plane does not unduly strain the stay bolt A, as the ball member $C^3$ is free to turn in the socket member $D^2$, and the corrugated sleeve C' yields sufficiently to allow such movement of the pawl member $C^2$ of the ball and socket joint. It will further be noticed that the stay bolt A is free to expand and contract as the corrugated sleeve C' readily yields in the direction of the axis of the stay bolt thus preventing undue straining of the sheets B and E.

The stay bolt A is provided at its forward end with the usual opening A' for the escape of water or steam in case the stay bolt A is broken. In practice, the outer end of the stay bolt A is formed into a head $A^2$ engaging the outer face of the nut C after the latter is screwed in position on the stay bolt A.

Having thus described my invention, I claim as new and desire to secure by Letters Patent:

1. A stay bolt for boilers and like structures, comprising a bolt, a plug and a sleeve nut screwing on the said bolt and having at one end a ball and socket joint with the corresponding end of the plug and having its other end rigidly connected to the other end of the plug.

2. A stay bolt for boilers and like structures, comprising a bolt adapted to be held in one boiler sheet, a tubular plug adapted to screw in the other boiler sheet and having a ball and socket at its outer end and a sleeve nut extending within the said plug and engaging the said bolt, the said sleeve nut having a ball at its outer end seated on the said socket and having its inner end rigidly connected with the inner end of the said plug.

3. In a stay bolt, a tubular plug and a sleeve nut extending within the said tubular plug, the said sleeve nut having its sleeve portion spaced from the plug, and having its inner end rigidly connected with the inner end of the plug, the outer end of the sleeve nut forming with the outer end of the said plug a ball and socket joint.

4. In a stay bolt, a tubular plug and a sleeve nut extending within the said tubular plug, the said sleeve nut having its sleeve portion spaced from the plug and corrugated in a direction transverse to the axis of the stay bolt, the inner end of the said sleeve nut being rigidly connected with the inner end of the said plug, and the outer end of the sleeve nut engaging the stay bolt and being seated on the outer end of the said plug.

5. In a stay bolt, a tubular plug, and a sleeve nut extending within the said tubular plug the said sleeve nut having its sleeve portion spaced from the plug and corrugated in a direction transverse to the axis of the stay bolt, the inner end of the said sleeve nut being rigidly connected with the inner end of the said plug, the outer end of the said sleeve nut screwing on the stay bolt and having a ball and socket joint connection with the outer end of the said plug.

In testimony whereof I have signed my name to this specification in the presence of two subscribing witnesses.

HARRY ANTHONY LACERDA.

Witnesses:
MORGAN WAGONER, Jr.,
EDWARD LOONAN.